(12) United States Patent
Ajamian

(10) Patent No.: US 7,184,560 B2
(45) Date of Patent: *Feb. 27, 2007

(54) CONTROL PLATFORM FOR MULTIPLE SIGNAL ROUTING AND INTERFACING IN AN AUDIO AND VISUAL ENVIRONMENT

(76) Inventor: Edward Y. Ajamian, 4548 Melbourne Ave., Los Angeles, CA (US) 90027

( * ) Notice: Subject to any disclaimer, the term of this patent is extended or adjusted under 35 U.S.C. 154(b) by 0 days.

This patent is subject to a terminal disclaimer.

(21) Appl. No.: 10/925,537

(22) Filed: Aug. 24, 2004

(65) Prior Publication Data

US 2005/0025321 A1   Feb. 3, 2005

Related U.S. Application Data

(63) Continuation of application No. 09/422,127, filed on Oct. 20, 1999, now Pat. No. 6,870,936.

(60) Provisional application No. 60/104,982, filed on Oct. 20, 1998.

(51) Int. Cl.
    *H04B 1/00* (2006.01)
(52) U.S. Cl. ........................... 381/119; 386/102
(58) Field of Classification Search ............... 381/119; 386/102, 104, 96, 99
    See application file for complete search history.

(56) References Cited

U.S. PATENT DOCUMENTS

| | | | | | |
|---|---|---|---|---|---|
| 4,524,452 | A | * | 6/1985 | Marshak | 381/119 |
| 4,635,288 | A | * | 1/1987 | Stadius | 381/119 |
| 5,488,669 | A | * | 1/1996 | Zampini et al. | 381/119 |
| 5,896,459 | A | * | 4/1999 | Williams, Jr. | 381/119 |

* cited by examiner

*Primary Examiner*—Ping Lee
(74) *Attorney, Agent, or Firm*—Blakely Sokoloff Taylor & Zafman LLP

(57) ABSTRACT

An intelligent control platform for routing, switching and mixing audio and visual signals includes a program signal crosspoint matrix which is programmably and adaptively configurable to select between appropriate program sources and program destinations when the system is in a particular one of a number of operational modes. Operational modes supported by the system include digitize mode, layback mode, edit and dub modes. The crosspoint matrix defines default signal paths between sources and destinations for each of the operational modes and precludes selection of any inappropriate signal path that would result in feedback loops, inappropriate signal levels or misdirected signals.

4 Claims, 10 Drawing Sheets

● = Default Crosspoint
○ = Selectable Crosspoint
X = Silence Select

● = Default Crosspoint
O = Selectable Crosspoint
X = Silence Select

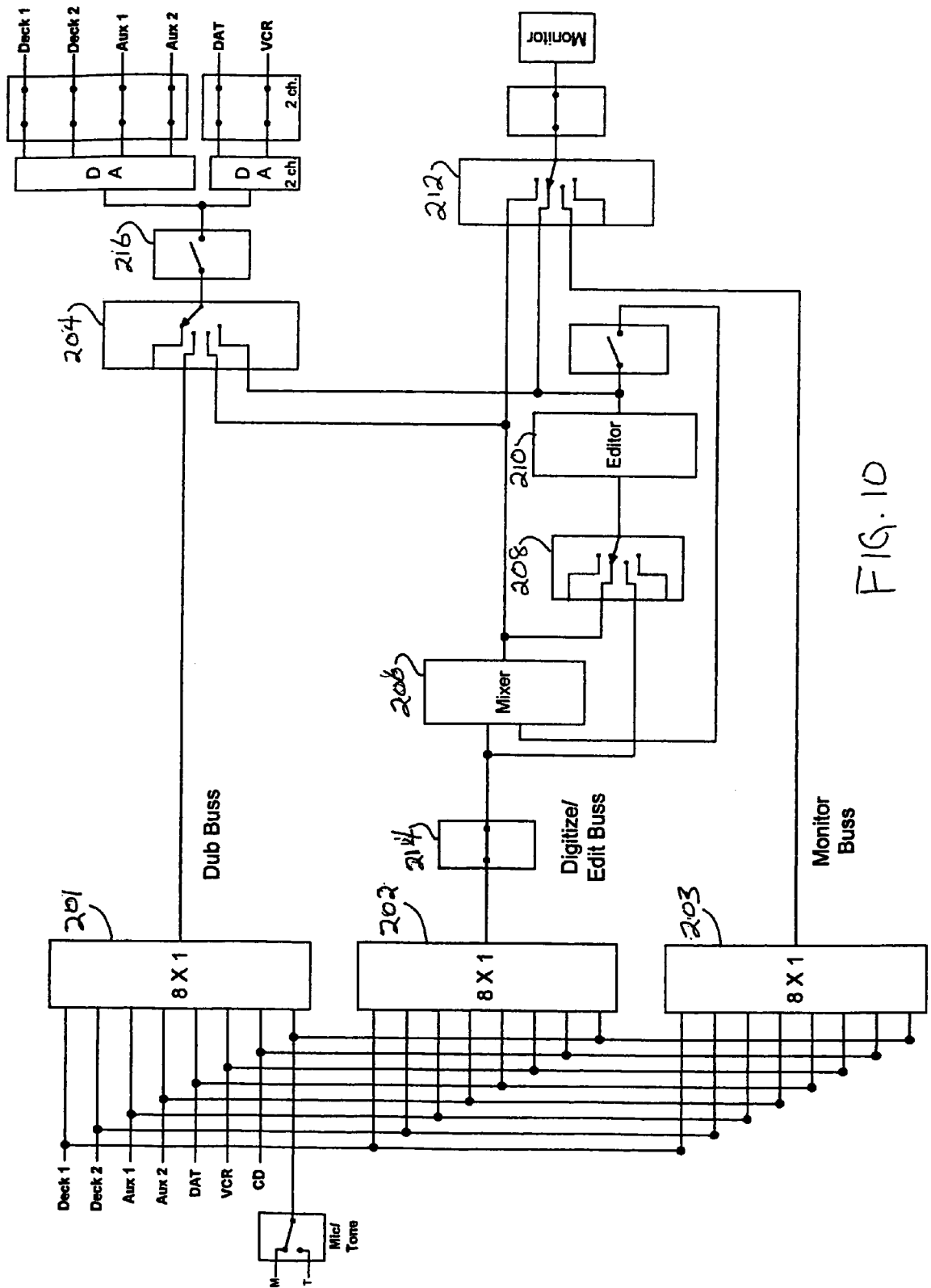

CONTROL PLATFORM FOR MULTIPLE SIGNAL ROUTING AND INTERFACING IN AN AUDIO AND VISUAL ENVIRONMENT

The present application is a continuation of pending U.S. patent application Ser. No. 09/422,127 filed on Oct. 20, 1999 now U.S. Pat. No. 6,870,936, by Applicant Edward Y. Ajamian, entitled "Control Platform for Multiple Signal Routing and Interfacing in an Audio/Visual Environment, which claims the benefit of U.S. Provisional Application Ser. No. 60/104,982, filed on Oct. 20, 1998.

FIELD OF THE INVENTION

The present invention relates generally to audio/visual signal selection systems and, more particularly, to an integrated audio router/mixer system control platform for intelligently routing, mixing, interfacing and processing audio/visual signals.

REFERENCE TO A XEROGRAPHIC COPY APPENDIX

The various embodiments of the present invention are implemented as a product specification. A xerographic copy of the product specification embodying the present invention, entitled Audio Manger, is provided herewith as an appendix. The contents of the appended xerographic copy, entitled Audio Manager, is incorporated herein by reference in its entirety.

BACKGROUND OF THE INVENTION

The growing market of non-linear video editing suites and audio production studios presents unique and dynamic challenges to the task of signal routing. Multiple signal routing configurations are needed to accomplish the various tasks required of these systems with an increasing number of significantly different program formats to be accommodated, as well.

Traditionally, these systems utilize an audio mixing console to provide for a portion of the audio routing tasks, but these systems are not specifically designed for that particular purpose additionally, most system operators familiar with the techniques and requirements of audio mixing are not particularly adept in navigating its topology for purposes other than audio mixing. Accordingly, relying on traditional audio mixing consoles for signal routing and for performing monitoring functions often results in feedback loops, improper level settings, and the frequent need to repatch various system components in order to eliminate interference and other unwanted distortion. Audio mixing consoles used in conventional audio production studios typically have provision for coupling to any one of a number of commercially available switching devices, which obviates the need for manual re-patching. However, switching device control panels are often as cumbersome and non-intuitive, as the mixing consoles, for the system operator to master.

For example, in order to route signals from a source device, such as an audio tape player, to a destination device, such as an audio tape recorder, separate switches are required for each of the signals generated by the tape player. Existing routing or switching systems require the operator to coordinate the switching of the intelligence (audio) and control signals independently of the mixing function. Accordingly, there is a need in the art for an improved audio router/mixer system controller that provides a simplified means of creating an integrated system for meeting audio routing, mixing, interfacing, level control, processing, format conversion, monitoring and metering requirements along with the video and data signal routing needs for video editing systems and audio production studios. Such a control platform should be able to intuitively couple source and destination devices together in a variety of modes, an intelligent fashion, where pressing one or two buttons is all that is required to configure the signal routing of the entire system for the various editing tasks. Such a system should provide the operator with default monitoring and metering selections and include an easy to interpret visual verification means, without causing improper routing configurations or destructive feedback loops.

SUMMARY OF THE INVENTION

To overcome the limitations in the prior art described above, the present invention is directed to an intelligent control platform for routing, switching and mixing audio/visual signals. The intelligent control platform includes a plurality of input ports, with each input port configured to define particular ones of a number of program sources, such as source decks, auxiliary inputs, DAT, CD inputs and the like. Each input port receives program signals from each corresponding program source. The intelligent control platform further includes a plurality of output ports, with each output port configured to define particular ones of a multiplicity of destinations, such as output decks, DAT and VCR devices, external editors, monitors, and the like. Each output port provides program signals to each corresponding destination. The intelligent control platform further includes an adaptively configurable program signal matrix circuit, coupled to receive program signals from each input port and to provide program signals to each output port, with the particular inputs and outputs selected in accordance with a particular desired operational mode. The operational modes might include digitize mode, layback mode, and edit and dub modes, with the digitize and layback modes further subdivided into modes that bypass internal or external faders or modes that include, i.e., are routed through, internal or external faders. The selection of a particular desired operational mode adaptively configures the program signal matrix to direct program signals along a default signal path devised to route the signals between the source and destination, while disabling any potential feedback signal paths.

In one particular aspect of the invention, the intelligent control platform includes internal fader controls, with the default signal path configurable to direct program signals through the faders in the first operational mode (digitize or layback via faders). The default signal path is further configurable to direct signals such that they bypass the faders in a second operational mode (digitize or layback bypass faders).

In further aspect of the invention, the intelligent control platform further includes means for coupling the default signal path through an external mixer. As was the case with the internal faders, the default signal path is configurable to direct program signals through the mixer in a first operational mode and to direct signals such that they bypass the mixer in a second operational mode.

In yet a further aspect of the invention, the program signal matrix is configurable to allow manual access to certain output ports where the selection of those output ports are appropriate to the operational mode defining the default signal path. The program signal matrix is configured in such a manner that inappropriate signal paths, that would result in feedback or misdirected signals, are disabled from user selection when the particular selected operational mode would preclude such selection.

BRIEF DESCRIPTION OF THE DRAWINGS

These and other features, aspects and advantages of the present invention will be more fully understood when considered in connection with the following specification, appended claims, and accompanying drawings, wherein:

FIG. 10 is a simplified, semi-schematic block diagram of the system configuration when the system is in the "digitize via mixer" mode.

DETAILED DESCRIPTION OF THE INVENTION

When editing video and/or audio programming with non-linear editing systems, a user must often audition and import audio from a variety of sources external to the editor. Such sources might include video tape sources such as beta, VHS or ¾ inch tape, compact disk sources, digital audio tape, microphones and the like. Once editing is completed, program information is often required to be exported from the editing systems to a destination device. Additionally, it is often desirable to make copies of audio programming material which requires inner connection to be made between a program source device and two or more external destination devices.

Traditionally, standard audio mixing console is utilized to select and route these various signals. However, due to the relative complexities of these consoles, the fact that they are not specifically designed for the particular task at hand, and that system operators are rarely adept in navigating their control topology, feedback loops, which are potentially destructive to monitor loud speakers at worst and annoying, at best, improper signal levels, and the frequent need for repatching various connectors, are among the awkward and time consuming result.

When standard matrix switches are employed, the need for manual re-patching may be eliminated, but standard matrix switch control panels, like those of the mixing consoles themselves, often prove operationally cumbersome for the system user and exhibit all of the attendant difficulties experienced when operating an audio mixing console. Neither approach gives the operator a convenient methodology to configure system patching, verify routing or properly monitor program result.

The present invention is directed to an audio router, system controller which provides a simplified means of meeting audio interfacing requirements of audio/visual editing systems and for controlling external video and data routers. The system might be characterized as an intelligent control platform which allows for intuitive operation where pressing one or two buttons is all that is required to configure system interconnect patching for various editing tasks. By means of an intelligent interconnect control, the control platform according to the present invention is able to accommodate a multiplicity of source and destination devices and be operable in a multiplicity of modes such that when switching between modes and devices, the system adaptively reconfigures the signal paths to eliminate the need for manual rerouting, misdirected program flow, improper signal level settings and feedback loops. The intelligent control platform according to the invention further enables an editing system to perform more than one function during a program session. System support simultaneous dubbing of one program while digitizing or editing a second, and while monitoring yet a third source.

Figure 1A:
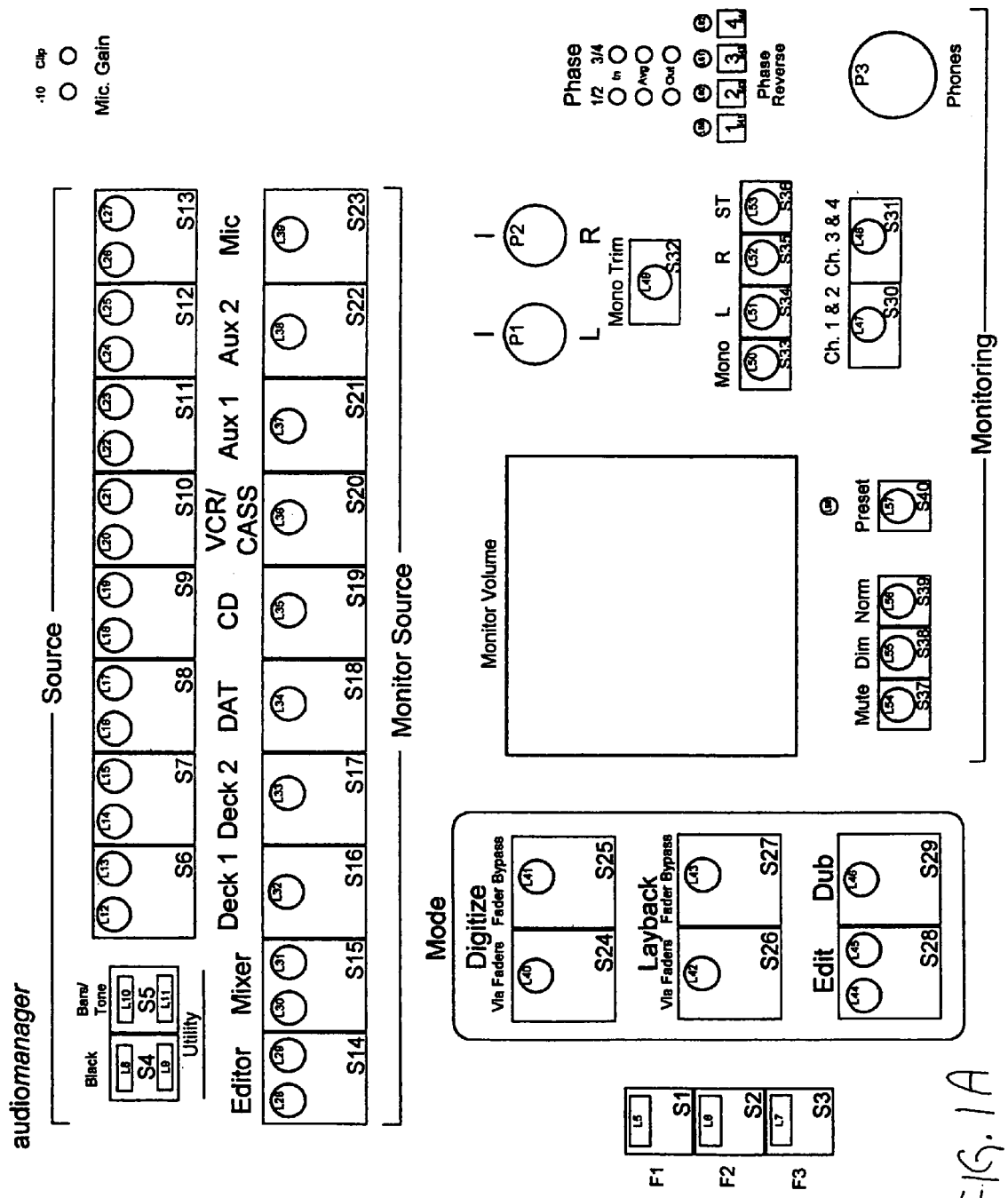
FIG. 1a is a semi-schematic plan view of a portion of the control panel of an intelligent control platform in accordance with the present invention.
Figure 1B:
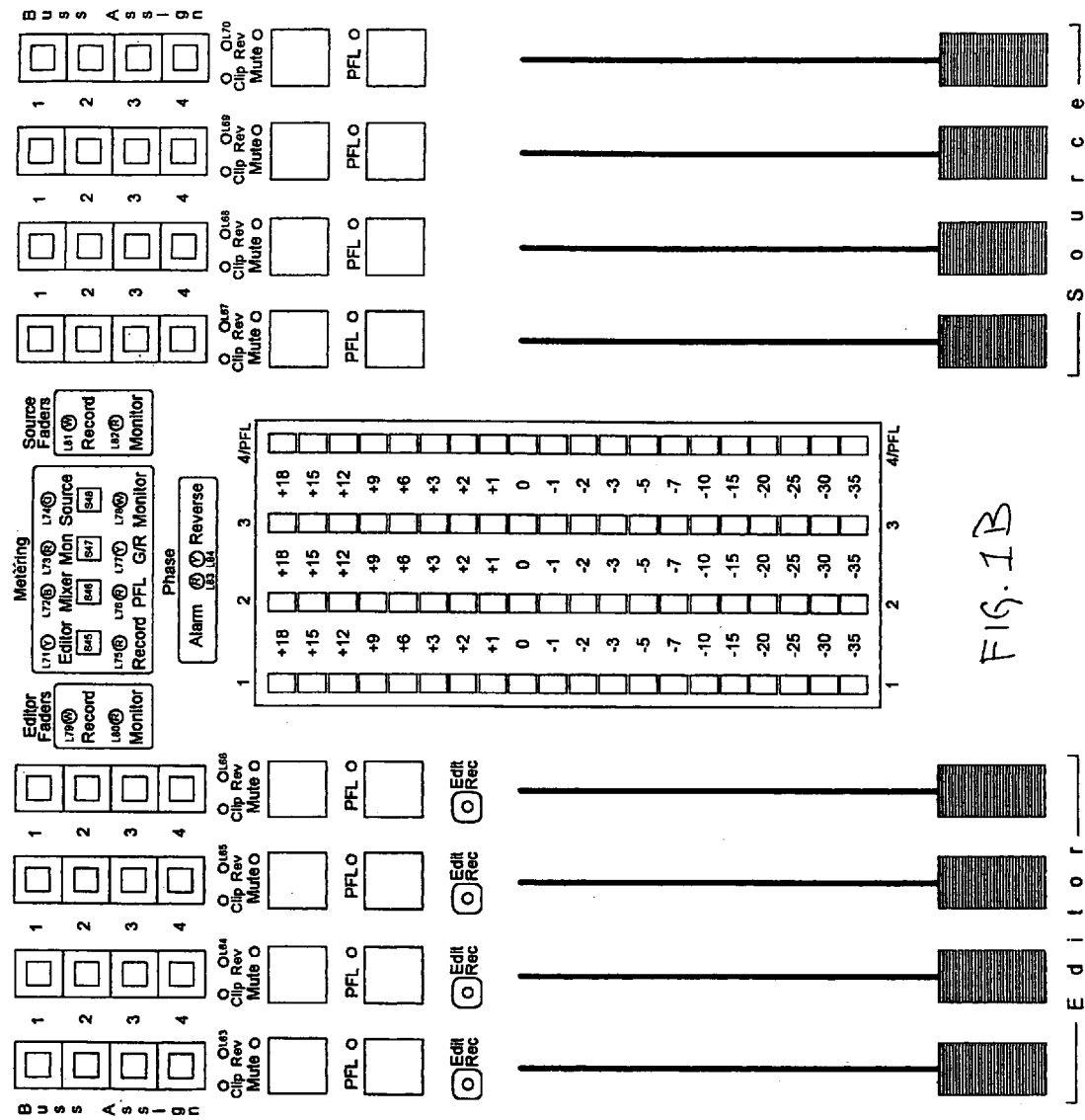
FIG. 1b is a semi-schematic plan view of a second portion of a control panel of an intelligent control platform in accordance with the invention, illustrating the location of internal source and editor faders.

Turning now to FIGS. 1a and 1b, the intelligent control platform is suitably implemented as a standard 19" rack mountable chassis which includes a multiplicity of conventional audio signal path connectors to which all forms of external devices, whether source devices, destination devices, monitoring loud speakers, or the like, are connected. The form and location of the various connectors providing inputs and outputs to the intelligent control platform according to the invention are not shown in the exemplary embodiment of FIGS. 1a and 1b, since they are conventional in nature and their particular configuration and location may vary depending on how the intelligent control platform is implemented into an overall system.

Signal switching and routing is accomplished according to a variety of methodologies ranging from, but not necessarily limited to, pre-configured crosspoint switch matrices to discrete switch points. The exemplary embodiment of FIGS. 1a and 1b allows the system operator to choose between and amongst specific operating modes relating to the editing process, select various audio program sources, and independently select and control the volume level of signals to, for example, monitor loud speakers.

In FIG. 1a, the intelligent control platform according to the invention includes a control panel having four main groupings of controls that operate the system. Specific functions and actions of these controls might be further subdivided into command sections, flow sections, and routing/switching sections.

In the command section, a first group of controls, termed MODE controls, identify the tasks that an operator might be called upon to carry out. Selecting any particular one of the modes creates a set of default conditions where particular signal routing configurations are defined. Once any particular mode is selected, the remaining modes may be automatically reset and/or locked out. A monitoring source is selected and protective loud speaker muting is activated as necessary.

Specifically, the mode controls include selections for digitizing a program signal and include selections for two particular digitization paths, a first path via the faders S24 and a second path which bypasses fader controls S25. A layback mode is provided that also includes two signal paths, a first path via faders S26 and a second path that bypasses the faders S27. An edit mode is provided S28 as well as a dub mode S29.

A further grouping of mode controls, termed FUNCTION KEYS or F keys, are provided Si, S2 and S3, which allow for customized routing and control schemes and which invoke user programmable functionality. Selecting any particular one of the modes creates a set of default conditions wherein all signal routing is preconfigured in accordance with the invention, other modes and functions may be reset and/or locked out and wherein the monitor source is selected.

A second control grouping in the exemplary embodiment of FIG. 1a includes source selection controls which identify the various sources of audio program material input to the control platform. The source selectors include selections for first and second program material decks S6 and S7, a selection for digital audio tape inputs S8, CD inputs S9, VCR/Cassette inputs S10, first and second auxiliary inputs S11 and S12, and a microphone input S13. Each of these source selections are coupled to appropriate input connectors and function to identify which of the connectors are activated so as to provide program material to the system.

A complimentary row of selectors for monitoring sources is further provided in the exemplary embodiment of FIG. 1a and function to identify which of the inputs containing program material are to be directed to the system monitors. The monitor source selectors include selections for each of the source inputs identified above, as well as selections for an editor S14 and mixer S15.

The fourth control group is generally related to the third or monitoring source control group, and function to control characteristics of the monitoring system. The monitor control group includes left and right level controls P1 and P2, a monotrim function switch S32, a bank of program selection switches for configuring the monitor system in mono mode S33, stereo mode S36 and for left S34 and right S35 signals. The monitor control section further includes a control bank, indicated in the embodiment of FIG. 1a as PHASE, for metering of inter-channel phase relationships and for accommodating phase reversal if necessary.

Turning now to FIG. 1b, the system further includes a set of source and editor faders, configured to function as level controls and to be disposed between and among the various inputs and outputs of the system. A bank of LED level indicators is coupled to the source and editor fader controls in order to provide a visual indication of signal energy through each individual ones of the four analog or digital channels comprising the source and/or editor controls.

Returning now to the exemplary embodiment of FIG. 1a, the digitize fader bypass (digitize mixer bypass) S25 mode functions to route a selected source directly to the editor record out connectors without program material being directed through any of the system's fader circuitry. In the digitize via fader (digitize via mixer) mode, a selected source is routed to the editor record out connectors through the source faders of FIG. 1b or alternatively through an external mixer by means of the system's source out connectors. In either case, whether routed through the source faders of FIG. 1b or through an external mixer, the return signal is directed to the editor record out connectors.

In the edit mode, the output from an externally disposed editor device is input to the system and routed through the system's editor faders of FIG. 1b, or alternatively to an external mixer by means of the system's source out connectors. In either case, the return signal is directed to the monitor bus for appropriate program monitoring. It should be noted, herein, that while in the edit mode, any selected source material chosen through the source program controls, is directed through the system's source faders of FIG. 1b, or to an external mixer, by means of the system's source out connectors. Whether controlled by the system's source faders or by an external mixer, this functionality enables simultaneous monitoring of the editor and source programs.

The system further provides for two separate layback modes, layback via faders or mixers, and layback with mixer or fader bypass. In the layback with mixer by pass mode, an editor's output is routed directly to all of the system's record outputs except those record outputs directed to the editor device itself. In the layback via mixer mode, an editor's output is directed to the system's editor faders of FIG. 1b (or to an external mixer via the system's editor program out connectors). The return signal is again routed to all of the system's record outputs except those pertaining to the editor device itself. In the dub mode (duplication mode), any selected source is directed to all of the system's record outputs, except those pertaining to the editor and, necessarily, those pertaining to the selected source. In this regard, and in terms of the present invention, "source" is deemed to relate to any device connected to the system's source input connectors with the source selection controls choosing the desired input source for digitizing, auditioning while editing, and dubbing. Each of the source program controls further includes a pair of colored LEDs with a first (typically a green LED) being lit when the system is in either the digitize or edit mode, while the other (typically a red LED) is lit when the system is in the dub mode.

Monitor source is deemed to relate to an input that contains program material which is desired to be routed to the monitor speakers. Depending on the particular mode (digitize, layback, edit or dub) selected, a monitor source default is automatically chosen. Notwithstanding automatic selection of monitor source, any monitor source can be manually selected at any time by a user by selecting the appropriate monitor source control.

Source out is taken to refer to the system's source out connectors which are coupled to the system's source faders of FIG. 1b and which further provide a direct pass-through for connection to an external mixing console. When the system is in the digitize or edit mode, the selected source is directed to the source out connectors. When the system is in dub mode, a next selected source, chosen from the multiplicity of source controls, is routed only to the record outputs, with the previously selected source remaining coupled to the source out connectors. In this regard, record output refers to the system's output connectors designed to couple the system's signals to other, external, system devices.

Editor program out refers to a set of system ports relating to the system's edit and/or layback modes. Specifically, an external editor's outputs are coupled to editor in connectors which are, in turn, routed directly to the editor program out port. Editor program out is routed to the system's editor faders of FIG. 1b or to an external mixing console, whenever the system is placed in the editor layback modes. In like manner, program in is deemed to refer to the returned signal from either the system's editor faders or from an external mixing console.

Figure 3:
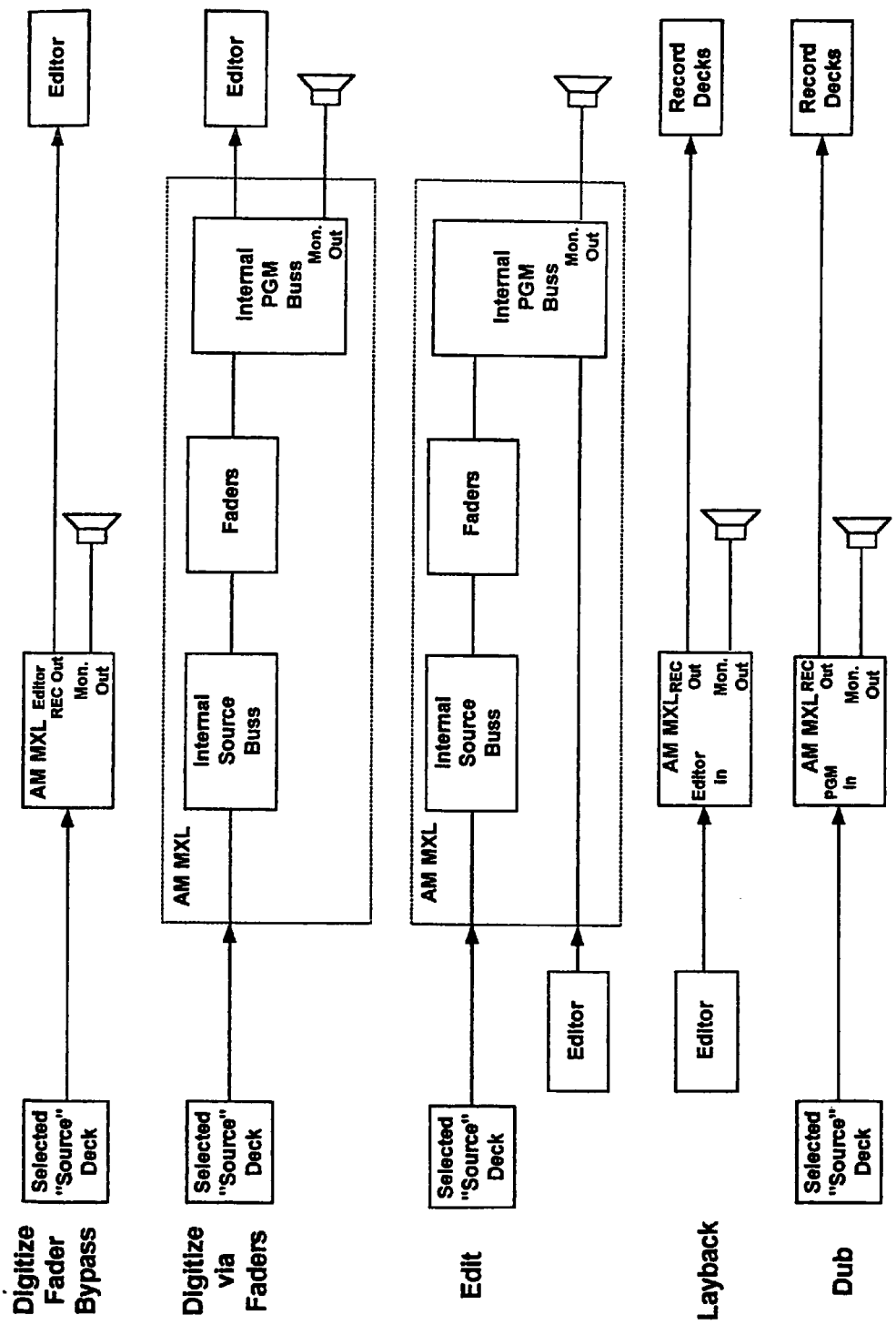
FIG. 3 is a semi-schematic simplified block level diagram of program flows, from input to output, for the selectable modes of the intelligent control platform of the invention.

Turning now to FIG. 3, various of the particular programmed functions of the intelligent control platform in accordance with the invention will now be described. Operationally, the system can be characterized as a configurable platform, that is default configured for various operational modes, such that appropriate signal inner connectivity is maintained while eliminating the possibility of feedback or misdirected signals.

Specifically, to send program information to a device, such as an editor, for digitization without the signal passing through the system's faders, the user selects the "digitize bypass faders" mode and identifies and selects the appropriate source device by depressing the appropriate source control switch. The mixer might be selected from the monitor source controls such that the source faders are unable to be used in order to create a monitor mix without effective program record levels. When configured in this manner, the system provides a signal from the selected source deck to a, for example, editor, via the editor record out connectors. Monitor mix signals are provided at the monitor out connectors for auditioning monitor mix information via, for example, lout speakers. In order to select a different program source, or deselect he current program source, the user must first deselect the digitize mode which, in turn, deselects the chosen source. The user then reselects the digitize mode and is able to then select a new program source. It should be noted that the dub mode is able to be selected while the system is in digitize mode.

Digitization using the source faders for level control is performed in substantially the same manner as "digitize bypass faders" above, except that the selected source is directed to the systems, internal source bus and thence, to the system's source faders. Once directed through the source faders, the signal is directed to internal program bus, in a manner to be described in greater detail below, for outputting to the appropriate editor device and, optionally, to a monitor.

To edit program material, the user must first de-select the digitize and layback modes, if any of the foregoing are already engaged. Once edit mode is selected, the system is configured to receive selected source material from the device selected by the source controls, as well as receive the input from an external editor device when editor is selected from the monitor source controls. In this case, the editor program outputs are directed through the editor faders of FIG. 1b in order to create a monitor mix. In similar fashion, in order to audition the selected source, while editing, selecting the source from among the source controls will direct the source program material, to the source faders of FIG. 1b and thence to the internal program bus to the monitor outputs.

In layback mode, without traversing the system's faders, a user must first deselect layback via faders, digitize and dub, if any of the aforementioned modes have been previously engaged. The user then selects "layback bypass faders" which couple an external editor device through the system to one or more record devices such as record decks for layback. As was the case with editing, above, mixer might be selected from among the monitor source controls such that the fader panel can be used to create a monitor mix without effecting signal throughput or signal recording levels. If it is deemed desirable to layback using the system's faders for level control and mixing, user must first deselect layback bypass faders, digitize and dub, if any of the foregoing have been previously engaged, and select "layback via faders" as the operative system mode. As before, the editor program outputs are directed through the system's editor faders of FIG. 1b before being directed to record devices by means of the system's record out connectors.

In the dub mode, the user must first deselect layback if that particular mode was previously engaged. In dub mode, any source that is selected is fed directly to the record out ports and thence, to all the other record decks, except for any that were previously assigned to digitize. In order to select a different program source, or de-select the current program source, the dub mode must first be de-selected then re-selected before a new program source is indicated by invoking the appropriate source control.

Figure 4:
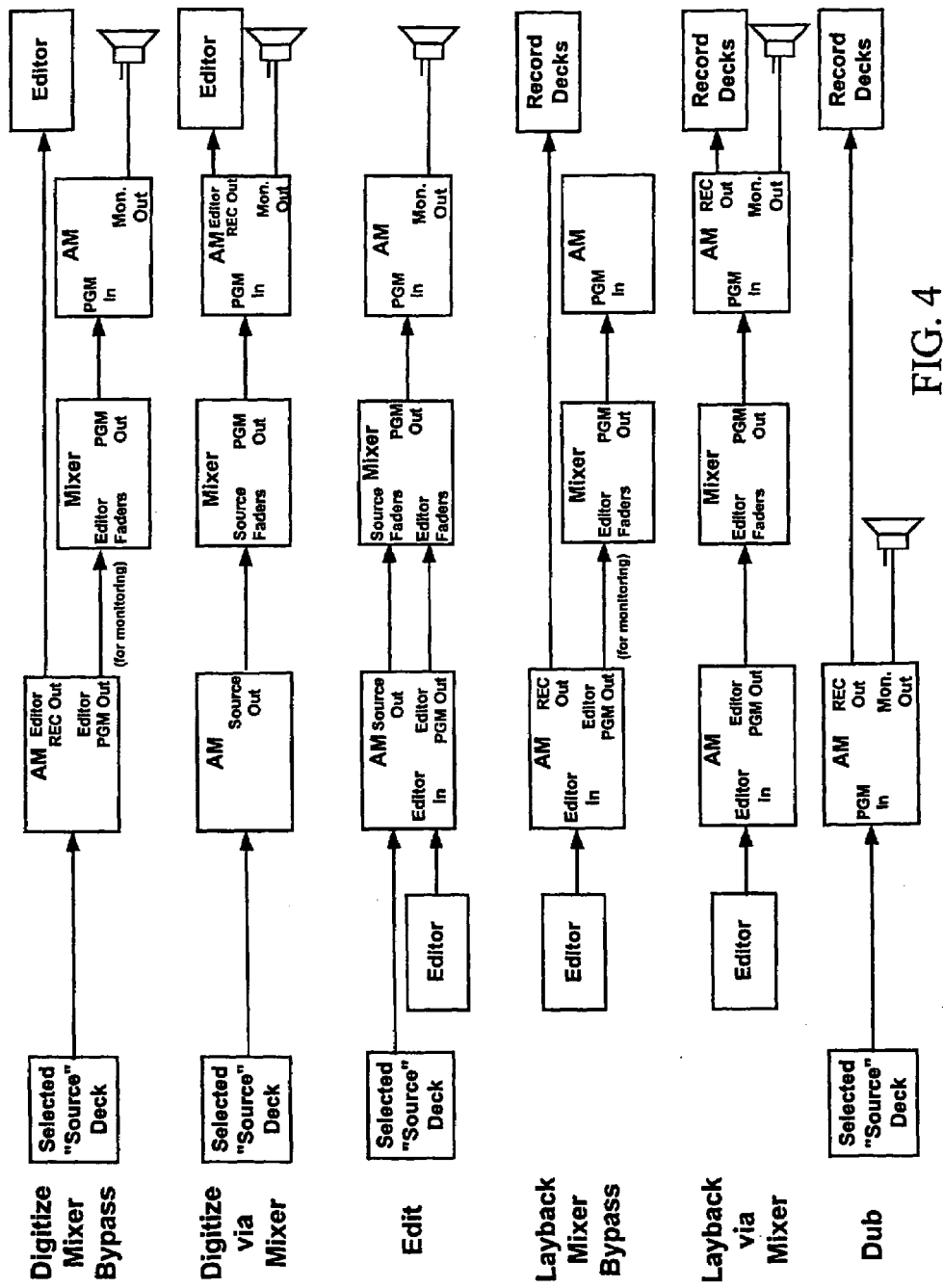
FIG. 4 is a simplified, semi-schematic block diagram of program flows for the various operational modes of the intelligent control platform, in the case where the device is coupled to an external mixer.

Turning now to FIG. 4, it will be evident that the intelligent control panel according to the invention is also capable of operating as an intermediary device between selected source devices, editor devices and various program record devices, in combination with additional external audio processing devices such as real and/or virtual mixers. In FIG. 4, in the digitize modes, both mixer bypass and the mixer modes, selected source material is directed to the intelligent control platform where source material is provided directly to an external editing device through the system's editor record out ports in the case of "digitize mixer bypass". The editor program outports are activated, for monitoring purposes, and provide selected source program material to an eternal mixer for coupling to the mixer's editor fader panel. The mixer's program out ports are coupled back to the intelligent control platform's program in ports where the signal is directed to a monitor output for connection to monitoring speakers. In the digitize via mixer mode, selected source material is directed through the intelligent control platform to its source out ports when signal is directed to the source faders of an external mixer. As in the previous case, the mixer's program outports are coupled to the intelligent control platform's program in ports whence mixed signals are provided to an external editor device through the system's editor record outports. Monitoring loud speakers may be coupled to the system's monitor outputs in order that program material might be monitored.

In the edit mode, selected source material is provided to the system as an input and an external editor is coupled to the editor in ports. Source material is directed through the device to the source out ports while editor material is directed to the editor program out ports. An external mixer is coupled to receive both source out and editor program out signals and direct them to appropriate source faders and editor faders to define a program out signal which is directed back into the intelligent control platform's program in ports. In layback modes, an external editor is coupled to the editor in port of the system and editor signals are directed through the editor program out ports to an external mixer. In the layback mixer by pass mode, editor program out signals are provided to the mixers solely for purposes of monitoring, while program material is directed to the record out port and thence to one or more record decks. Where an external mixer is used for monitoring, the mixer's program out ports are coupled back into the intelligent platform's program in ports for monitoring. In layback via mixer mode, the editor program out port provides program signals to an external mixer whose program out is fed back into the program in port of the intelligent control platform. As in the foregoing case, mixed program material is directed to the record out port and thence to one or more record decks. Likewise, program material may be directed to the monitor output port for receipt by monitor loud speakers. Dub mode, in the exemplary embodiment of FIG. 4, functions in the same manner as dub mode in the exemplary embodiment of FIG. 3, with selected source material provided to the system's program in port and the record out port shunting material directly to one or more record decks.

Figure 5:
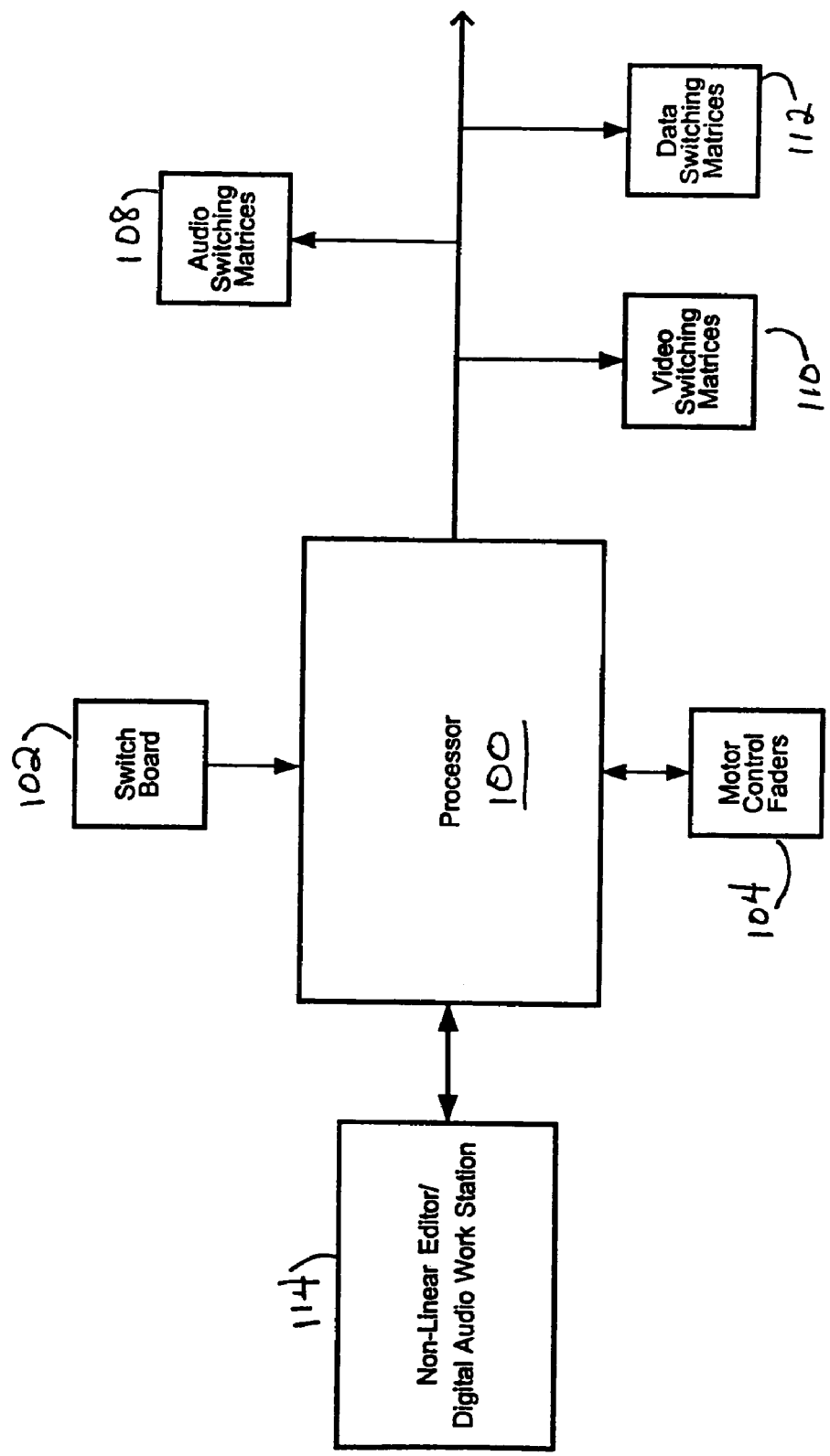
FIG. 5 is a simplified, semi-schematic block diagram of the electronic architecture of the intelligent control platform according to the invention.

FIG. 5 depicts the electronic functional blocks that, in combination, form the intelligence of the intelligent control platform in accordance with the invention. In particular, the focal point for electronic processing of the intelligent control platform is a microprocessor 100. The particular type of microprocessor is not necessarily material to the form and function of the invention, but should be one of a type which is capable of providing a multiplicity of energizing signals to a cross point matrix, as will be described in greater detail below. The source, monitor source, mode, and other selection controls described in connection with FIGS. 1a and 1b, above, are identified in the embodiment of FIG. 5 as the switch board 102 which functions to provide control signals to the microprocessor 100. Also providing control signals to the microprocessor 100 are the editor faders and source faders, identified as motor controlled faders 104 in the embodiment of FIG. 5. A bus 106 is coupled between the microprocessor 100 and a plurality of functional sub blocks of the system, including audio 108, video 110 and data 112 switching matrices that operate, under software program control of the microprocessor 100 to accommodate the intelligent signal switching, routing and signal processing functions of the invention.

In addition, the microprocessor 100 is configured for interoperability with an external non-linear editor device or a digital audio workstation, each of which are conventional in the art and require no further elaboration herein. The coupling between the microprocessor 100 and the non-linear editor/digital audio workstation 114 is conventional in manner and requires only that the appropriate interface connectors, cards and application routines be provided.

As was described above, the switching matrices 108, 110 and 112 are an important enabling feature of the present invention and form the heart of the intelligent control platform's signal routing and processing functions. A generalized switch matrix 120 is configured as a 32×32 crosspoint matrix, with functionality generally provided in terms of 4-channel sets. Exceptions to the general case will be developed further below, but it is sufficient for understanding the invention to generalize the crosspoint matrix in terms of 4-channel input and output devices. Inputs to the crosspoint matrix 120 include a 4-channel editor in port that might also include a format conversion circuit, conventionally provided and typical of switching and routing system's editor inputs. The format conversion circuit 122, although included in the exemplary embodiment of FIG. 5, is an optional device which may be provided or not provided as necessary. A second set of inputs to the crosspoint matrix 120 is a PFL input, typically provided as a single line input. First and second decks, i.e., source deck 1 or source deck 2, are provided as 4-channel signals as inputs to the crosspoint matrix 120 as is a 4-channel auxiliary 1 source input that might be provided in either an XLR or RCA configuration. Thus, in the exemplary embodiment of FIG. 5, the auxiliary 1 input is depicted as being coupled through an XLR/RCA selector 124 prior to introduction of the crosspoint matrix 120.

Aux 2 is a 2-channel input directly provided to the crosspoint matrix 120 as is the DAT input, intended for digital audio tape applications. VCR and CD inputs are both 2-channel inputs and are each directed through a buffer amp, 126 and 128 respectively, prior to introduction to the crosspoint matrix 120. A single channel microphone preamp, coupled between the crosspoint matrix 120 and a microphone input, as well as a single channel "pink noise" tone generator 130 form additional inputs to the matrix.

A 4-channel mix program in port is further provided which cross couples a 4-channel input to the matrix to a mixing bus that functions to multiplex a 4-channel source output signal and a 4-channel editor program output signal. Alternatively, the mix program in port is used to couple to an external mixer, in order to receive the external mixer's programming information as an input signal.

Outputs of the crosspoint matrix 120 are disposed substantially similar fashion as the inputs, with a 4-channel editor output port being directed through a format conversion circuit 132 in a manner similar to the editor input port. Record out to deck 1 and record out to deck 2 define two additional 4-channel output ports as does the Aux 1 record out port. As in the input case, 15. DAT and VCR define two 2-channel output ports with the VCR port being directed through a buffer amplifier 134. The monitor out port is a 4-channel port and might be configured through an external monitor select device 136 to direct the program material to the monitor out connectors or to a connector suitable for connecting to a set of headphones. A metering/phase sensor port is further provided and is used for supplying control signals to the meters and phase sensors comprising the inventive system.

The crosspoint matrix 120 further supports two additional 4-channel output ports, a source out port and an editor program out port. The source out port receives input information and directs program material through the system's source faders 138 and thence to the mix bus which redirects the signal to the system's 4-channel mix program in port. As was described above, the source out port is activated, i.e., is functional, in the case where the system is in edit mode or digitize via faders mode. The editor program out port directs program information either through the system's local editor faders 140 or through a fader bypass activated by fader bypass relays 142 and 144. It should be mentioned, herein, that the local editor fader controls might function as a source of servo signals in the case where it is desired to provide volume control to an external computerized digital audio workstation.

In this regard, it should further be noted that the 4-channel source out and editor program out ports, in combination with their signal routing paths in the crosspoint matrix 120 function as an internal source bus that is able to route signals through the system's source and editor faders prior to the signals being returned to the system. The 4-channel mix program in port, in combination with its routing lines in the crosspoint matrix 120 further function as an internal program bus, configured to receive signals either from the internal source bus after having passed through the system's faders, or from an external mixer, and redirect those signals, as a program source, to an appropriate output port.

Figure 6:
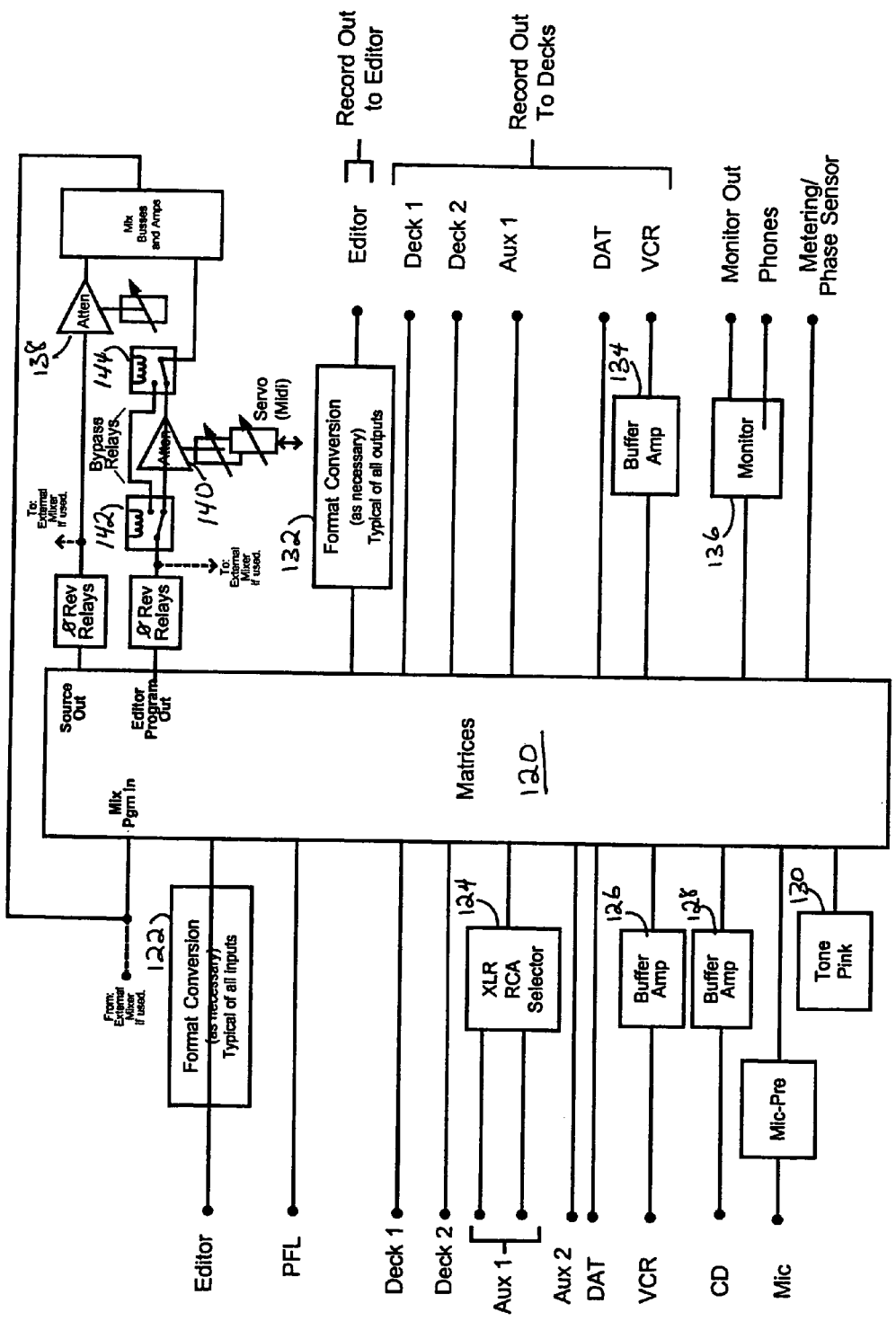
FIG. 6 is a simplified, semi-schematic block diagram of the input and output connections, directed through a central crosspoint matrix, in accordance with the invention.
Figure 7:
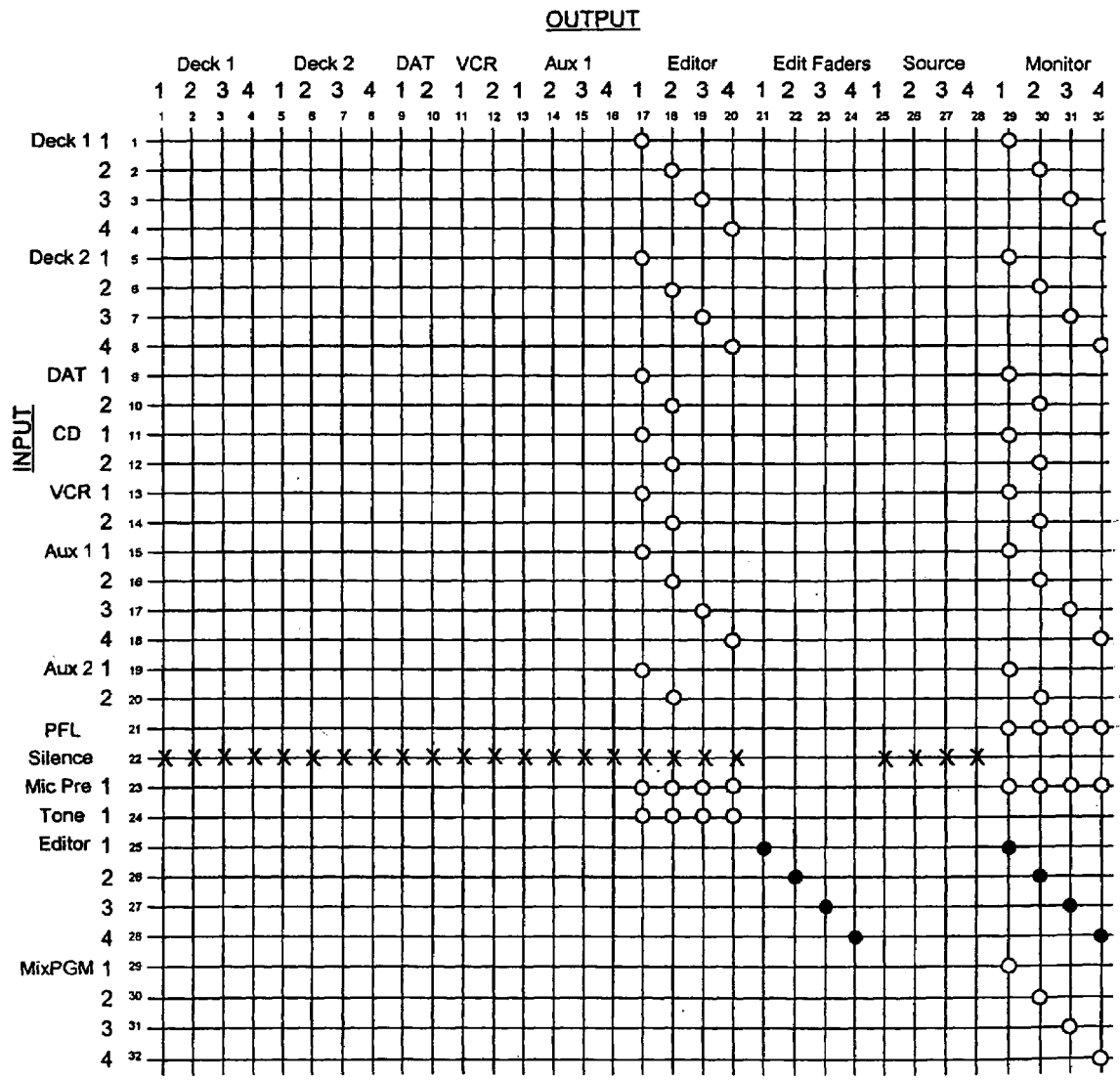
FIG. 7 is a crosspoint switch diagram illustrating configuration of the crosspoint matrix to couple inputs to outputs in the "digitize bypass faders" mode.
Figure 8:
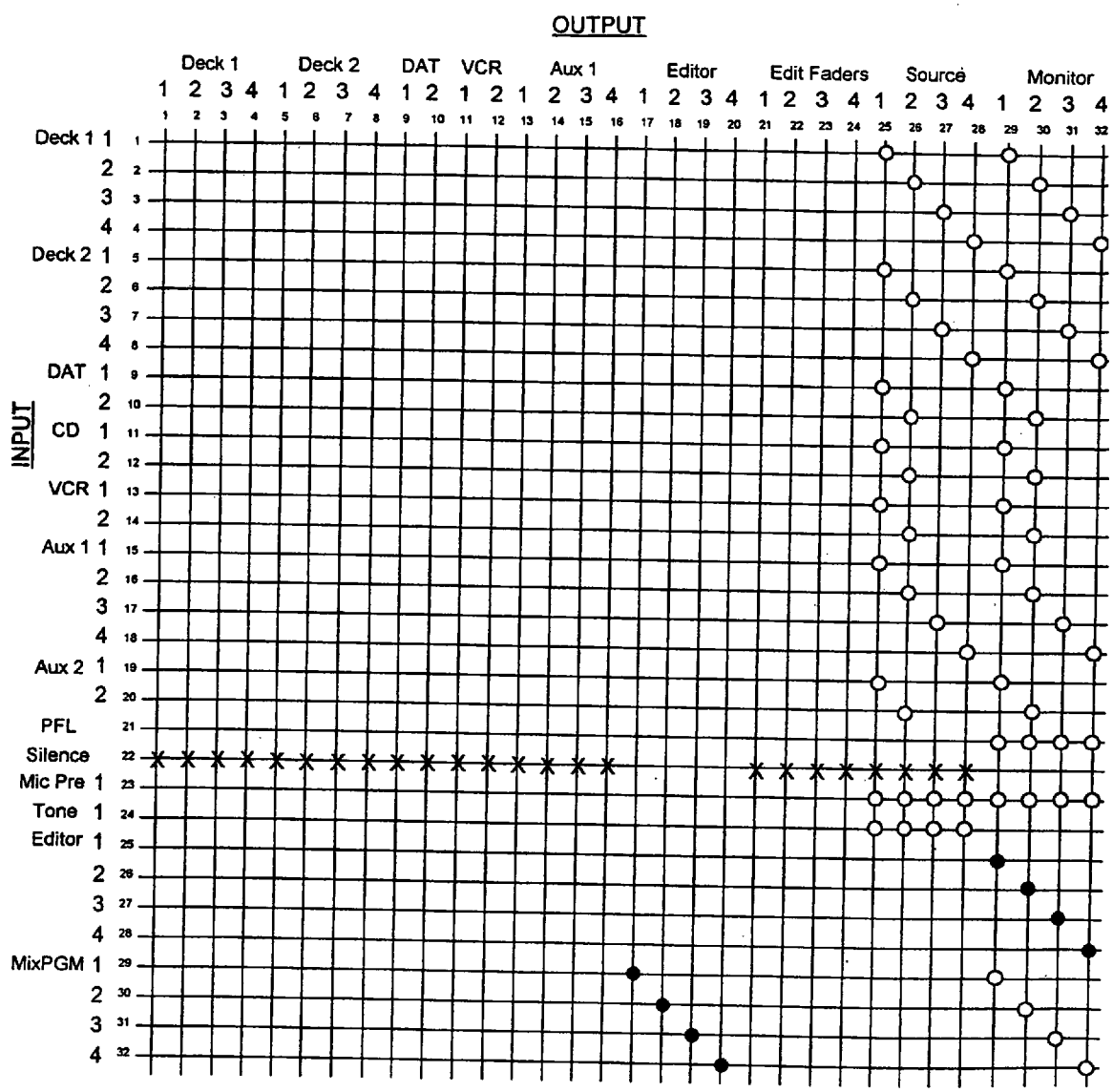
FIG. 8 is a crosspoint switch diagram illustrating configuration of the crosspoint matrix to couple inputs to outputs in the "digitize via faders" mode.

A specific example of how the crosspoint matrix might function in connection with a particular programming function is depicted in the crosspoint matrix diagrams of FIGS. 7 and 8. FIG. 7 depicts the connection points that would obtain in the crosspoint matrix 120 of FIG. 6, when the system is in the "digitize bypass faders" mode, while the illustration of FIG. 8 depicts the connections that would obtain in the crosspoint matrix 120 of FIG. 6, when the system is in the "digitize via faders" mode. In the illustration of FIG. 7, default connections are made between input lines, on the left hand side of the matrix, and output lines, identified along the top of the matrix diagram, by solid crosspoint connection circles. Specifically, when the system is in the "digitize bypass faders" mode, the 4-channel editor inputs are default connected to the 4-channel edit faders output and the 4-channel monitor output, by default. In addition, optional connections, i.e., selectable crosspoint modes are, identified by open crosspoint circles and indicate that while in "digitize bypass faders" mode, the deck 1, deck 2, DAT, CD, VCR, and auxiliary inputs might be optionally coupled to the 4-channel editor output, as well as the 4-channel monitor output. Thus, in the "digitize bypass faders" mode, the default, and non de-selectable, crosspoint connections are made between the 4-channel editor inputs and the 4-channel edit fader outputs.

In the "digitize via faders" case, represented by the crosspoint diagram of FIG. 8, the default program source is indicated, by the filled crosspoint circles, as comprising the 4-channel editor input, which is directed to the monitor output, and the 4-channel mix program input, which is default coupled to the 4-channel editor record out port. Where the mix program in provides the program source, it should be evident from the foregoing discussion, that the actual program source has either been directed through the faders via the internal source bus or through an external mixer as was described above.

Figure 9:
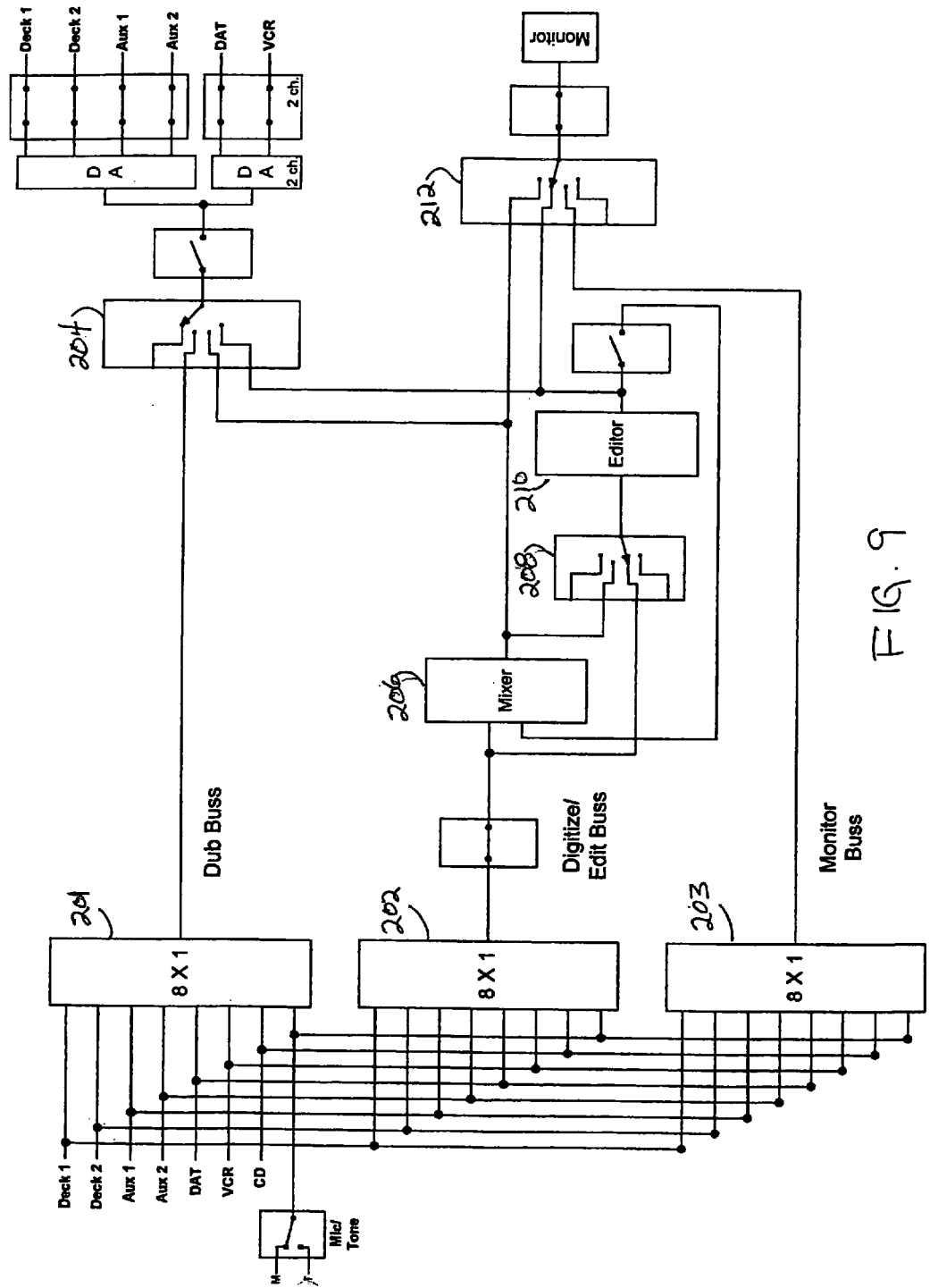
FIG. 9 is a simplified, semi-schematic block level diagram of the system configuration when the system is in the "digitize mixer bypass" mode.

Turning now to FIGS. 9 and 10, which depict in simplified semi-schematic form, a generalized system configuration diagram for the "digitize mixer bypass" and "digitize via mixer" cases developed in connection with the crosspoint matrix diagrams of FIGS. 7 and 8. In FIG. 9, in the "digitize mixer bypass" mode, the input portions of the crosspoint matrix might be represented as three sets of input blocks, each comprising 8 individual input ports and where each of the input blocks are coupled to one of three buses, a dub bus, a digitize/edit bus and a monitor bus. The three input blocks 201, 202 and 203, can be characterized as 8×1 input matrices which multiplex 8 inputs to a single bus output. In the case when the system is in the "digitize mixer bypass" mode, it can be seen from the embodiment of FIG. 9, that the inputs that are directed to the dub bus terminate in a selection module 204 at a particular signal input that is not selected by the selector switch. Thus, none of the source inputs are directed to any of the system's deck 1, deck 2, Aux 1, Aux 2, DAT or VCR outputs.

In contrast, the source inputs selected by multiplexer 202 to the digitize/edit bus, are directed to the mixer 206 as well as to a second switch circuit 208, corresponding to selectable program points on the corresponding crosspoint matrix. The signal line entering the switch circuit 208 is selected by switches operating the crosspoint matrix under software program control of the microprocessor, and the signal on the digitize/edit bus is thence directed to an external editor 210. The editor output is further directed to the first switch circuit 204 to a signal set which is not selected, indicating that the editor output is not to be redirected to any of the system's defined output ports. The editor output is further directed to an additional switch circuit 212, also representing a set of crosspoint matrix connections, operating under software program control of a microprocessor, where its particular signal line is selected by the switch indicating that the editor output signal is to be directed to the system's monitor output and thence to a set of monitoring loud speakers.

The final system bus, the monitor bus, selected by multiplexer 203, is coupled to the monitor switch circuit 212 and terminates in a line unselected by the monitor switch. Thus, neither the monitor bus nor the dub bus contain active signals.

Further, it should be evident from the position of the mixer switch 208, that the signal selected to be provided to the editor 210, are taken from the input to the mixer 206. Thus, the mixer output is not selected and the mixer 206 is deemed "bypassed".

In FIG. 10, the system configuration is generally similar to the system configuration exemplified in FIG.>9, except that the system has been put in "digitize via mixer" mode which adaptively reconfigures the crosspoint matrix, effectively repositioning the switch position of the mixer switch 208. In this particular configuration, input source signals are directed to the digitize/edit bus through multiplexer 202 and are again directed to the mixer 206. However, the mixer switch circuit 208 is set in a position which taps the signal line at the output of the mixer and directs signals appearing on that line to an external editor 210. Thus, signals being directed to the editor are routed through the mixer 206 instead of bypassing the mixer as in the previous case.

Signals output from the editor are again directed to the monitor switch circuit 212 where the are again selected by the monitor switch, indicating that editor output signals are to be directed to a set of monitor loud speakers. Likewise, editor output signals are directed to the output switch circuit 204 where they are not selected, indicating that editor output signals are not to be directed to any of the system's defined outputs.

From the exemplary system configuration block diagrams of FIGS. 9 and 10, it would be evident how the various switch circuits might be operatively and adaptively configurable by the crosspoint matrix operating under program software control to support the various other operational modes of the system. For example, in the dub mode, the digitize/edit switch 214, at the entry point of the digitize/entry bus, would be opened rendering the circuitry and functionality past that switch inoperative. The output switch circuit 204 would be activated so as to access the dub bus signal line and the output enable switch 216 would be closed, enabling input source material to be directly routed through the system to any of the system's defined outputs. Likewise, the monitor bus signal line would be selected by the switch of the monitor switch circuit 212, thus enabling the input source material to be monitored.

Various other system configurations will immediately come to mind of those having skill in the art upon examining the disclosure of the present invention. Those having skill in the art will immediately recognize that the features and functions of the intelligent control platform according to the invention are able to be implemented with a variety of different structural elements and in a variety of shapes, sizes and configurations. Additional conventional circuitry can be easily accommodated in the various signal paths for audio/visual pre and post-processing should such functions be desirable in particular applications.

In summary, the present invention provides for an intelligent control platform for selecting among and between input and output audio/visual devices an adaptively configuring an internal signal matrix to safely and efficiently accommodate only the desired operational mode. As an editing switch, the present invention allows a user to easily and safely select a particular source and destination device while precluding improper signal routing through an appropriate source or destination selection.

The foregoing description of the illustrated embodiments of the invention have been presented for purposes of illustration and description. It is thus not intended to be exhaustive nor to limit the invention to the particular forms or embodiments shown. It is intended that the scope and spirit of the invention be not limited by the exemplary embodiments, but rather by the appended claims.

The invention claimed is:

1. An intelligent control platform comprising: a plurality of audio and video input ports configured to define particular ones of a multiplicity of program sources; a plurality of audio and video output ports; a control processor; a plurality of selectable operational mode selection controls; an adaptively configurable switching matrices, a dub buss, a digitize/edit buss and a monitor buss, and means for coupling a default signal path, the default signal path configurable to direct program signals in a first operational mode, and to direct signals such that they bypass a mixer in a second operational mode, wherein the switching matrices defines particular ones of a multiplicity of operational signal interconnects in operative response to selection of a corresponding one of the selectable operational modes, the intelligent control platform routs, switches and mixes audio signals and video signals, and routing of audio and video signals and routing of audio and video input and output ports is automatic upon operational mode selection, and the intelligent platform operates to simultaneously dub a first program source, digitize or edit a second program source, and monitor a third program sources, and the operational modes are selected from the group consisting of digitize, layback, edit and dub modes.

2. An intelligent control platform comprising: a plurality of audio and video input ports, each input port configured to define particular ones of a multiplicity of program sources, each input port receiving program signals from a corresponding program source; a plurality of audio and video output ports, each output port configured to define particular ones of a multiplicity of destinations, each output port providing program signals to each corresponding destination; an adaptively configurable program signal matrix circuit, coupled to receive program signals from each input port and to provide program signals to each output port, the particular input and output ports automatically selected in accordance with a mode select circuit, the mode select circuit adaptively configuring the matrix to pass program signals along a default signal path devised to route the signal solely from the source to the destination while disabling any potential feedback signal paths, a dub buss, a digitize/edit buss and a monitor buss, and means for coupling the default signal path through an external mixer, the default signal path configurable to direct the program signals through the mixer in a first operational mode, and to direct signals such that they bypass the mixer in a second operational mode, wherein the intelligent control platform automatically routs and automatically switches audio and video signals input through the plurality of input ports based on a selected mode, and mixes audio and video signals input through the plurality of input ports, and the intelligent platform operates to simultaneously dub a first program source, digitize or edit a second program source, and monitor a third program source, and the operational modes are selected from the group consisting of digitize, layback, edit and dub modes.

3. The intelligent control platform according to claim 2, further comprising internal fader controls, the default signal path configurable to direct program signals through the faders in a first operational mode, and to direct signals such that they bypass the faders in a second operational mode.

4. The intelligent control platform according to claim 2, wherein the program signal matrix circuit comprises a multichannel crosspoint matrix fabric, the crosspoint matrix fabric including switch energized crosspoint coupling nodes, the switches energized to define signal routing interconnects under software program control of a microprocessor.

* * * * *